United States Patent
Chiu

[11] 3,905,397
[45] Sept. 16, 1975

[54] TUBULAR FOOD CASINGS
[75] Inventor: Herman S. Chiu, Chicago, Ill.
[73] Assignee: Union Carbide Corporation, New York, N.Y.
[22] Filed: Oct. 15, 1974
[21] Appl. No.: 514,731

[52] U.S. Cl. .... 138/118.1; 117/155 R; 117/155 UA; 117/143 A; 117/95
[51] Int. Cl.² .................. F16L 11/00; B05B 13/06
[58] Field of Search ...... 117/155 R, 155 UA, 143 A, 117/138.8 A, 95; 260/65; 162/184, 169, 162, 162/135, 164, 168; 138/118, 118.1, 137

[56] References Cited
UNITED STATES PATENTS

| | | | |
|---|---|---|---|
| 3,099,641 | 7/1963 | Caldwell et al. | 260/65 |
| 3,248,280 | 4/1966 | Hyland | 162/164 |
| 3,622,528 | 11/1971 | Longoria | 162/164 |
| 3,692,092 | 9/1972 | Longoria | 162/164 |

*Primary Examiner*—Cameron K. Weiffenbach
*Assistant Examiner*—Ralph E. Varndell
*Attorney, Agent, or Firm*—F. Schoenberg

[57] ABSTRACT

A tubular food casing having a coating adhered to the internal surface thereof comprising the reaction product of a polyethylene imine polymer and a dimer of a ketene having the formula

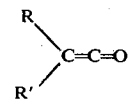

where R and R' are selected from the group consisting of hydrogen and $C_4$-$C_{26}$ alkyl, aryl and cycloalkyl groups, not more than one of the R and R' groups being hydrogen, and said coating being present in an amount sufficient to impart improved peelability of said coated casing from food products processed therein.

17 Claims, No Drawings

TUBULAR FOOD CASINGS

The present invention relates to improved food casings and more particularly to fibrous web reinforced cellulosic food casings that are suitable for encasing and processing food products and that are readily removed from about the processed food product, and to methods of making such casing.

Tubular food casings are used extensively for processing a wide variety of meat products and other food items. The tubular casings are generally thin-walled tubing of various diameters prepared from regenerated cellulose, cellulose derivatives, collagen and the like. Fibrous webs may also be embedded in these food casings and such casings are commonly referred to as "fibrous food casings".

There are a large number of different types of food products manufactured and an even greater number of food product manufacturers and each of the manufacturers may have his own recipe and processing conditions to suit different tastes and regional preferences.

The many differences in recipes and modes for processing different types of food products generally necessitate different types of casings for different uses. In some instances, for example, food casings are required to have multifunctional uses wherein they are used as containers during processing of a food product encased therein and then also serve as a protective wrapping for the finished product. In the meat processing industry, however, the preparation of many types of processed meats, such as various types of sausages, beef rolls, ham and the like, frequently involves removing the casing from about the processed meat product prior to slicing and final packaging.

When the casing is removed from about the processed meat mass, there is generally a tendency for some meat to adhere to the casing and be torn from the meat product, thereby causing surface marring of the meat product as well as loss of a portion of the meat itself.

Heretofore many attempts have been made to solve the problem and a number of these suggestions do provide some relief. For example, it is known in the art that the application of certain types of coatings to the inside wall of a tubular food casing, such as disclosed in U.S. Pat. Nos. 2,901,358 to Underwood et al., 3,106,471 to Firth, 3,307,956 to Chiu et al., 3,442,663 to Turbak and 3,451,827 to Bridgeford, affords improvement in release characteristics of the casing from a variety of sausage and other meat products. While the materials and procedures disclosed have been found to be useful for many products, the problem has not been completely solved and various types of meat and other food product are still found to adhere to the casing or, as disclosed for example in U.S. Pat. Nos. 3,158,492 to Firth and 3,582,364 to Rose et al., other undesirable side effects may result.

In accordance with the present invention, it has been discovered that tubular food casings having a coating adhered to the internal surface thereof comprising the reaction product of a ketene dimer and a water-soluble polyethylene imine, exhibit improved peelability to emulsion and non-emulsion types of food products encased and processed therein.

There is also provided, in accordance with the present invention, a method for preparing tubular food casings that exhibit improved peelability characteristics comprising the step of treating the internal surface of a tubular food casing with a coating composition comprising a curable admixture of a ketene dimer and a water-soluble polyethylene imine polymer in an amount to be more fully discussed hereinafter.

The novel tubular food casings of the present invention can be utilized in the preparation of a variety of food products including, for example, in the processing of meat products such as ham with mildly alkaline cure and subsequent water cooking, to produce a product from which the food casing can be readily stripped without scarring the surface of the encased meat product.

Tubular food casings and particularly tubular regenerated cellulose casings, including tubular fibrous casings, fabricated by any one of the methods well known in the art, are suitable for use in preparing the food casings of the present invention.

Essential components of the coating employed in accordance with the present invention are ketene dimers and a water-soluble polyethylene imine polymer as hereinafter more fully described.

The ketene dimers of the coating are dimers of ketenes of the formula:

where R and R' are selected from the group consisting of hydrogen, and $C_4$-$C_{26}$ alkyl, aryl and cycloalkyl groups, not more than one of the R and R' being hydrogen. These ketenes are generally prepared from naturally occurring fatty acids. Preferably, the ketene dimers are prepared from ketenes where R is $C_{12}$-$C_{18}$ as described in detail in U.S. Pat. No. 2,762,270. In particular, hexadecyl ketene dimer, hexadecenyl ketene dimer, octadecyl ketene dimer, octadecenyl ketene dimer, dimers of mixtures of ketenes obtainable from fats, oil and the like may be employed. Also suitable are dimers of monoalkyl and monoaryl ketenes, dialkyl ketenes, diaryl ketenes, cycloalkyl ketenes and dicycloalkyl ketenes, and the like, including, for example, phenyl ketene, dioctyl ketene, tolyl ketene, decyl phenyl ketene, cyclohexyl ketene and benzyl ketene.

Commercially available ketene dimers which are especially useful in the coating of the present invention are alkyl ketene dimers or mixtures thereof sold under the trademark AQUAPEL by Hercules, Inc.

The polyethylene imine component of the coating of the invention is a cationic polymer of polymerized ethylene imine that is water soluble, contains substantial portions of primary, secondary and tertiary amines and, preferably, has a molecular weight greater than about 20,000. Suitable polyethylene imine polymers are commercially available in aqueous solution and are sold under the trademark CHEMICAT by Alcolac Chemical Corporation.

The amount of coating adhered to the internal surface of the food casing of the invention that is necessary to impart the desired release characteristics thereto is important but can vary over a wide range. In general, a coating composition employed in treating the surface of the casing should be applied thereto so that an amount of between about 2 mg/100 in² (0.31 mg/100 cm²) and 16 mg/100 in² (2.5 mg/100 cm²) of ketene dimer component and between about 0.2 mg/100 in² (0.031 mg/100 cm²) and 4 mg/100 in² (0.62 mg/100 cm²) of polyethylene imine polymer component is applied to the internal surface of the casing. The proportion of the polyethylene imine component applied to the internal surface of the casing relative to the ketene dimer component should generally range in a ratio by weight of between about 1:1 and 1:20 and, preferably, in a weight ratio of about 1:5.

In carrying out the method of the present invention, a mixture of the ketene dimer and polyethylene imine polymer components herein described, preferably in the form of an aqueous dispersion, is applied to the inside surface of the tubular cellulosic, fibrous or other casing in any desired way. In general, following the application of the coating, the casing is heated to remove water and accelerate interaction between reactive components and the casing surface.

Coating compositions suitable for use in treating tubular casings to impart release characteristics thereto and to prepare casings of the present invention may be prepared by any method known in the art but are preferably homogeneous aqueous dispersions of the essential components. The concentration of the ketene dimer and polyethylene imine components in the coating composition may vary over a wide range, but the relative proportions of the coating components are important. In general, the concentration of the ketene dimer component should be between about 0.3% and 5% by weight and the concentration of the polyethylene imine component can vary relative to the ketene dimer component in the weight ratio of about from 1:1 to 1:20. Preferably, an aqueous coating composition will contain between about 0.5% and 3% by weight of the ketene dimer component and the polyethylene imine component should be present relative to the amount of ketene dimer in a weight ratio of about 1:5.

In a preferred embodiment, an aqueous coating composition suitable for use in accordance with the practice of the present invention is prepared by first separately preparing a dilute aqueous neutralized solution of the polyethylene imine polymer and a dilute aqueous dispersion of the ketene dimer. The neutralized polyethylene imine solution and the ketene dimer dispersion are then admixed to prepare the aqueous dispersion coating composition. The aqueous polyethylene imine solution is neutralized to a pH of about 7 with an organic acid such as lactic acid.

Various supplemental materials may be incorporated into the coating compositions of the present invention provided, of course, that the material added is compatible with the coating composition and has no adverse effect upon its stability or on the properties of the tubular casing to be treated. Among the materials that may be added are, by way of illustration, water-soluble vegetable gums, such as gum arabic and gum karaya, water-soluble surfactants, cellulose ethers, various cationic water-soluble polymers, and the like. It has been found that the use of emulsifying agents in preparing the coating compositions are generally undesirable and should, therefore, be avoided.

According to one embodiment of the present invention, application of the aqueous coating composition to the inside surface of the tubular casing can be made by the technique which involves the use of a "slug" of aqueous coating composition inside the tubing to be treated, as described and illustrated in U.S. Pat. No. 3,378,379 to Shiner et al. Final processing including drying of the casing and curing of the resins may be performed as described in U.S. Pat. No. 3,378,379 or any other suitable method well known in the art.

The invention will become more clear when considered together with the following examples which are set forth as being merely illustrative of the invention and which are not intended, in any manner, to be limitative thereof. Unless otherwise indicated, all parts and percentages are by weight.

EXAMPLE I

Coating compositions were prepared from two different types of ketene dimers using the following procedures and proportions of ingredients.

A dilute polyethylene imine polymer solution was prepared as follows:

| Polyethylene imine solution (50% solids) | 100 gms |
|---|---|
| Demineralized water | 1150 gms |
| | 1250 gms. |

The ingredients were stirred until a total solution resulted. The solution was neutralized with concentrated lactic acid (85%) to a pH of about 7. The polyethylene imine polymer employed had a molecular weight of about 30,000 that was purchased under the trademark CHEMICAT P-145 from Alcolac Chemical Corporation as a 50% aqueous solution having a viscosity at 25°C. of 20,000 cps, a density of 1.074 g/ml and nitrogen content of 16%.

Ketene dimer dispersions were prepared as follows:

| A) Demineralized water | 2460 gms |
|---|---|
| Ketene dimer A | 90 gms |
| | 2550 gms. |

The ketene dimer A employed was derived from oleic acid and was purchased under the trademark AQUAPEL 421 from Hercules, Inc. It was supplied in the form of an oily liquid having a melting point of −22°F. and density of 7.3 lbs/gal.

The mixture of ketene dimer and water was homogenized for about half an hour.

| B) Demineralized water | 2460 gms |
|---|---|
| Ketene dimer B | 90 gms |
| | 2550 gms. |

The ketene dimer B employed was an alkyl ketene dimer derived from a mixture of palmitic and stearic fatty acid ketenes that was purchased under the trademark AQUAPEL 364 from Hercules, Inc. It was supplied as a flaked solid having a bulk density of 25 lbs/cu. ft. and a melting point of 41.3°C. Ketene dimer B was melted at a temperature of about 65°C. and the melted ketene dimer-water mixture was mechanically homogenized for about one half hour and then cooled to room temperature.

Coating compositions were prepared as follows:

Coating Composition A: 450 Grams of the neutralized polyethylene imine solution prepared as described above were added to 2550 gms of ketene dimer A emulsion and then mechanically homogenized. The dispersion contained 3% ketene dimer and 0.6% polyethylene imine.

Coating Composition B: 450 Grams of the neutralized polyethylene imine solution were added to 2550 gms of ketene dimer B dispersion and then mechanically homogenized. The dispersion contained 3% ketene dimer and 0.6% polyethylene imine.

The following casing samples were prepared using the coating compositions hereinabove described:

Casing Sample A: Size 12 fibrous gel stock was treated with coating composition A using the "slugging" technique disclosed in U.S. Pat. No. 3,378,379. The coated fibrous casing was dried in a drier set at a temperature of 95°C. The resulting coated casing had a flat width of 9 inches which is the standard dimension for size 12 dried tubular fibrous casing.

Casing Sample B: Size 12 fibrous gel stock tubular casing was treated with coating composition B using the "slugging" technique disclosed in U.S. Pat. No. 3,378,379. The coated fibrous casing was dried in a drier set at a temperature of 95°C.

Casing Samples A and B were used in the processing of a ham meat product where ham meat was cured with CURAFOS phosphate solution and then stuffed into the casing. The stuffed casing was placed into stainless steel molds which are designed to form a finished product of predetermined size and shape. The molds were closed and then immersed in tubs wherein the meat product was cooked in water at about 200°F. for several hours. After the meat product was processed, the molds were opened and the casing samples were found to be readily strippable from the processed meat with little or no meat sticking to the casing and with the surface of the meat product being deemed to be completely satisfactory.

EXAMPLE II

The following tubular fibrous casings were prepared.

Casing A: Size 12 fibrous gel tubular casing was treated with an aqueous dispersion coating composition containing 4.55% ketene dimer and 0.35% polyethylene imine polymer prepared using the procedure of Example I. The ketene dimer employed in this Example was derived from oleic acid and was purchased under the trademark AQUAPEL 421 from Hercules, Inc. The polyethylene imine polymer of Example I was used in preparing the coating composition of this Example and the polyethylene imine solution was neutralized to a pH of about 7 with concentrated lactic acid. The treated casing sample was dried at a temperature between 70°C. and 80°C.

Casing B: Size 12 fibrous gel tubular casing was treated with an aqueous dispersion coating composition containing 4.55% ketene dimer using the "slugging" procedure of Example I. The ketene dimer used was derived from oleic acid and was purchased under the trademark AQUAPEL 421. The treated casing was dried at a temperature between 70°C. and 80°C.

Casing C: A control tubular fibrous casing prepared according to the teaching of U.S. Pat. No. 2,901,358 to Underwood et al. The coating for this casing was a water soluble, Werner type complex in which a fatty acid is coordinated with chromium that was purchased under the trademark QUILON C from E. I. du Pont de Nemours, Inc.

Casing Samples A, B and C were used in processing a ham meat product using the procedure of Example I.

After the meat product was processed and the molds were opened, casing sample A was found to be readily strippable from the processed meat and the surface of the meat was satisfactory. Casing Samples B and C were found to adhere to the processed meat and when peeled from the surface thereof, tore substantial portions of the meat from the surface. The surfaces of all meat products processed in Casing Samples B and C were badly scarred and unsatisfactory.

The results of this test show the substantial improvement in casing peeling characteristics of casings prepared in accordance with the present invention when used in the processing of meat products where mildly alkaline curing conditions are employed as one step in the process.

EXAMPLE III

This example illustrates the excellent correlation that has been found between actual performance of casing samples and peelability thereof from processed meat products and water-repellency tests run on casing samples after immersion in boiling water and boiling alkaline solutions. The TAPPI Routine Control Method RC-212, a Water-Repellency Test For Linerboard, was employed in this evaluation with water-repellency ratings of 5 to 0 defining the water-repellency of the sample under test. The water-repellency ratings listed define the trail made by a drop of water traveling over a sample held at a 45° angle:

5 — Perfect roll off
4½ — A few round drops on trail
4 — Round drops covering 1/4 of the trail
3½ — Oblong drops covering 1/4 of the trail
3 — 1/2 of the trail wetted
2 — Broken wet trail much narrower than drop
1 — Even wet trail slightly narrower than drop
0 — Even wet trail as wide as drop.

The coating compositions employed in preparing Casing Samples A, B and C of Example II were evaluated for water repellency before and after coated samples of the casing were immersed in boiling water for 15 minutes and other coated samples were immersed in a boiling CURAFOS phosphate solution of 1% concentration (CURAFOS is the trademark of Merck & Co. for a food grade polyphosphate meat curing compound). The water-repellency test results are reported in Table 1 below.

TABLE 1

| Casing Sample | Coating | Water-Repellency Rating | | |
|---|---|---|---|---|
| | | Initial | Boiling Water | CURAFOS Phosphates |
| A | Ketene Dimer-PEI* | 5 | 3 | 2-3 |
| B | Ketene Dimer | 5 | 0 | 0 |
| C | Fatty Acid-Chromium Complex | 5 | 4 | 0-1 |

*PEI - polyethylene imine polymer

The higher degree of water-repellency found for Casing Sample A after immersion in the boiling CURAFOS phosphate solution correlates well with the improved peelability characteristics found for Casing Sample A as reported in Example II.

In Table 2 below are reported water-repellency test results for Casing Samples A and B of Example I, both of which coated casing samples exhibited excellent peelability properties from the meat product as reported in Example I.

TABLE 2

| Casing Sample | Coating | Water-Repellency Rating | |
|---|---|---|---|
| | | Initial | 1 Min. 1% Boiling CURAFOS Phosphate Solution |
| A | Ketene Dimer A/PEI | 5 | 3½ to 4 |
| B | Ketene Dimer B/PEI | 5 | 3½ to 4 |

EXAMPLE IV

In another series of experiments various casings were coated on the inside surface using the "slugging" method of Example I.

Casing Sample A: Coated with a 1% aqueous dispersion of AQUAPEL 364 ketene dimer. A coating of about 5 mg/100 in² (0.77 mg/100 cm²) ketene dimer was applied to the internal surface of the casing.

Casing Sample B: Coated with a 1% aqueous dispersion of AQUAPEL 421 ketene dimer. A coating of about 5 mg/100 in² (0.77 mg/100 cm²) ketene dimer was applied to the internal surface of the casing.

Casing Sample C: Coated with an aqueous dispersion containing 1% AQUAPEL 364 ketene dimer and 0.2% of the polyethylene imine polymer of Example I. The coating composition was prepared using the procedure of Example I. A coating of about 5 mg/100 in² (0.77 mg/100 cm²) ketene dimer and about 1.1 mg/100 in² (0.17 mg/100 cm²) of polyethylene imine was applied to the internal surface of the casing.

Casing Sample D: Coated with an aqueous dispersion containing 1% AQUAPEL 421 ketene dimer and 0.2% of the polyethylene imine polymer of Example I. The coating composition was prepared using the procedure of Example I. A coating of about 5 mg/100 in² (0.77 mg/100 cm²) ketene dimer and about 1.1 mg/100 in² (0.17 mg/100 cm²) of polyethylene imine was applied to the internal surface of the casing.

Casing Sample E: Coated with an aqueous emulsion containing 2.7% AQUAPEL 360XC ketene dimer and 0.4% of the polyethylene imine polymer of Example I. AQUAPEL 360XC is an emulsified form of AQUAPEL 364 ketene dimer supplied by Hercules, Inc. AQUAPEL 360XC contains 6% ketene dimer in aqueous emulsion with a cationic starch derivative, the total solids of the emulsion being 7%. The coating composition employed in this sample was prepared by diluting the AQUAPEL 360XC emulsion with water to a 2.7% solids content and then adding 0.4% of the neutralized polyethylene imine polymer of Example I. A coating of about 13.5 mg/100 in² ketene dimer and 2.2 mg/100 in² polyethylene imine was added to the internal surface of the casing.

Water repellency tests were run on the casing samples of this Example and the results are summarized in Table 3 below.

TABLE 3

| Casing Sample | Water-Repellency Rating | |
|---|---|---|
| | Initial | 5 Min. 1% Boiling CURAFOS Phosphate Solution |
| A | 5 | 0 |

TABLE 3-Continued

| Casing Sample | Water-Repellency Rating | |
|---|---|---|
| | Initial | 5 Min. 1% Boiling CURAFOS Phosphate Solution |
| B | 5 | 0 |
| C | 5 | 4½ |
| D | 5 | 4½ |
| E | 5 | 0 |

Casing Samples C and D exhibited substantially improved water-repellency ratings over Casing Samples A and B which shows the excellent durability of the coating of the present invention under conditions that may be encountered during the processing of certain types of meat products. The results determined for Casing Sample E indicate the apparent interference with the interaction between the ketene dimer and polyethylene imine polymer that results when an emulsifying agent was used in the preparation of the coating composition.

What is claimed is:

1. A tubular food casing having a coating adhered to the inner surface thereof comprising the reaction product of a polyethylene imine polymer and a dimer of a ketene having the formula

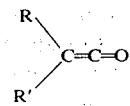

where R and R' are selected from the group consisting of hydrogen and $C_4$-$C_{26}$ alkyl, aryl and cycloalkyl groups, not more than one of the R and R' groups being hydrogen, and said coating being present in an amount sufficient to impart peelability of said coated casing from food products processed therein.

2. The food casing of claim 1 in which said ketene dimer is present in an amount between 2 mg/100 in² and 16 mg/100 in² of casing surface and said polyethylene imine polymer is present in an amount of at least 0.2 mg/100 in² and in a weight ratio to said ketene dimer that ranges between about 1:1 and 1:20.

3. The food casing of claim 2 wherein said polyethylene imine polymer is present in said coating in the ratio by weight to said ketene dimer of about 1:5.

4. The casing of claim 1 wherein said ketene dimer is an alkylketene dimer derived from a fatty acid selected from the group consisting of oleic acid, palmitic acid, stearic acid and mixtures thereof.

5. The casing of claim 1 wherein said ketene dimer is an alkylketene dimer derived from oleic acid.

6. The casing of claim 1 wherein said ketene dimer is an alkylketene dimer derived from a mixture of palmitic and stearic fatty acids.

7. The casing of claim 1 wherein said polyethylene imine polymer is water soluble and has a molecular weight of at least about 20,000.

8. The tubular casing of claim 1 wherein said tubular casing comprises a fibrous cellulosic casing.

9. The method of preparing a tubular food casing that exhibits improved peelability characteristics to meat products encased therein which comprises the steps of coating the inside surface of a tubular food casing with an aqueous coating composition comprising a curable admixture of a polyethylene imine polymer and a dimer of a ketene having the formula

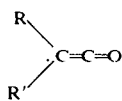

where R and R' are selected from the group consisting of hydrogen and $C_4$-$C_{26}$ alkyl, aryl and cycloalkyl groups, not more than one of the R and R' groups being hydrogen, and then curing the coating applied to the surface of said casing.

10. The method of claim 9 in which the concentration of ketene dimer in said aqueous coating composition is between about 0.3% and 5% by weight and the polyethylene imine polymer is present in said coating composition in the ratio by weight to ketene dimer of between about 1:1 and 1:20.

11. The method of claim 9 wherein said ketene dimer is an alkylketene dimer derived from a fatty acid selected from the group consisting of oleic acid, palmitic acid, stearic acid and mixtures thereof.

12. The method of claim 9 in which said ketene dimer is an alkylketene dimer derived from oleic acid.

13. The method of claim 9 in which said ketene dimer is an alkylketene dimer derived from a mixture of palmitic and stearic fatty acids.

14. The method of claim 9 in which said polyethylene imine polymer is water soluble and has a molecular weight of at least about 20,000.

15. The method of claim 11 in which said polyethylene imine polymer is water soluble and has a molecular weight of at least about 20,000.

16. The method of claim 9 wherein said tubular food casing is a fibrous cellulosic casing.

17. The method of claim 9 wherein said coating composition is applied to the inside surface of said casing in an amount sufficient to provide at least about 2 mg/100 $in^2$ of casing surface of said ketene dimer.

* * * * *